United States Patent
Mizuno et al.

(10) Patent No.: US 10,229,062 B2
(45) Date of Patent: Mar. 12, 2019

(54) STORAGE SYSTEM, STORAGE CONTROL METHOD, AND RELAY DEVICE

(71) Applicant: HITACHI, LTD., Tokyo (JP)

(72) Inventors: Makio Mizuno, Tokyo (JP); Norio Shimozono, Tokyo (JP); Katsuya Tanaka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 117 days.

(21) Appl. No.: 15/126,006

(22) PCT Filed: Jul. 11, 2014

(86) PCT No.: PCT/JP2014/068622
§ 371 (c)(1),
(2) Date: Sep. 14, 2016

(87) PCT Pub. No.: WO2016/006111
PCT Pub. Date: Jan. 14, 2016

(65) Prior Publication Data
US 2017/0177485 A1    Jun. 22, 2017

(51) Int. Cl.
*G06F 12/00* (2006.01)
*G06F 12/0868* (2016.01)
(Continued)

(52) U.S. Cl.
CPC ............ *G06F 12/0868* (2013.01); *G06F 3/06* (2013.01); *G06F 3/0601* (2013.01);
(Continued)

(58) Field of Classification Search
CPC .. G06F 12/0868; G06F 3/0601; G06F 3/0604; G06F 3/0658; G06F 3/067
See application file for complete search history.

(56) References Cited

U.S. PATENT DOCUMENTS 6,378,039 B1 * 4/2002 Obara ............... G06F 3/0601
                                                    711/114
8,423,677 B2    4/2013 Nakamura et al.
(Continued)

FOREIGN PATENT DOCUMENTS

JP    2006-107019 A    4/2006
JP    2007-188341 A    7/2007
(Continued)

*Primary Examiner* — Gurtej Bansal
(74) *Attorney, Agent, or Firm* — Volpe and Koenig, P.C.

(57) ABSTRACT

A storage system includes a plurality of controllers each including a processor module and a memory, and a relay unit to relay a communication between the processor modules. The relay unit executes assignment determination to determine one of the processor module of a first controller and the processor module of a second controller is a processor module processing a command stored in the memory. The first controller includes memory storing the command, and the second controller is any of the controllers other than the first controller. When the relay unit determines the command of the processor module of the first controller, the relay unit notifies storage location information of the command to the processor module of the first controller, and when the relay unit determines the command to be processed by the processor module of the second controller, the relay unit transfer the command to the second controller.

13 Claims, 14 Drawing Sheets

(51) Int. Cl.
  *G06F 3/06*         (2006.01)
  *H04L 29/08*        (2006.01)
  *G06F 12/0806*          (2016.01)

(52) U.S. Cl.
  CPC ............ *G06F 3/0604* (2013.01); *G06F 3/067* (2013.01); *G06F 3/0658* (2013.01); *H04L 67/1097* (2013.01); *G06F 12/0806* (2013.01); *G06F 2212/284* (2013.01)

(56) References Cited

U.S. PATENT DOCUMENTS

| | | | |
|---|---|---|---|
| 2003/0103460 A1* | 6/2003 | Kamath | .................. H04L 47/10 370/236.2 |
| 2006/0075176 A1 | 4/2006 | Okamoto | |
| 2007/0168610 A1 | 7/2007 | Kobayshi et al. | |
| 2008/0126581 A1 | 5/2008 | Komikado et al. | |
| 2011/0296129 A1 | 12/2011 | Arai et al. | |
| 2013/0159620 A1 | 6/2013 | Sakashita et al. | |

FOREIGN PATENT DOCUMENTS

| | | |
|---|---|---|
| JP | 2008-134775 A | 6/2008 |
| JP | 2013-515980 A | 5/2013 |

\* cited by examiner

Fig. 7

| Transmission source identifier | Logical volume identifier | Processor identifier |
|---|---|---|
| 00.00.ef | 0 | 1 |
| 00.01.10 | 1 | 20 |
| 00.01.20 | 2 | 9 |

STORAGE SYSTEM, STORAGE CONTROL METHOD, AND RELAY DEVICE

TECHNICAL FIELD

The present invention generally relates to a technique for a storage system.

BACKGROUND ART

One known technique for a storage system achieves higher performance and availability of the storage system with a plurality of storage devices forming a cluster, and a host computer evenly issuing an I/O request to the storage devices in the cluster (PTL 1). Another known technique for a storage system achieves higher performance and availability of the storage system with a plurality of processor modules (hereinafter, referred to as "processors") controlling a single channel, and one of the processors that has received the I/O request from the host computer assigning the I/O request to another one of the processors (PTL 2).

CITATION LIST

Patent Literature

[PTL 1] US 2013/0159620
[PTL 2] U.S. Pat. No. 8,423,677

SUMMARY OF INVENTION

Technical Problem

In the storage system in PTL 1, the host computer that issues the I/O requests is required to evenly issue the I/O requests to the plurality of storage devices forming the cluster. However, in many cases as represented by a storage system based on a virtual environment, it is difficult for the host computer side to evenly issue the I/O requests. In the storage system in PTL 2, a processing load imposed on the processor that has received the I/O request is high The processor executes the processing for the I/O request as well as various other types of processing. Thus, when the I/O receiving process load after the I/O request has been received is high the performance of the storage system as a whole might be degraded.

In view of the above, an object of the present invention is to achieve a smaller processing load, related to an I/O request from a host computer, on a processor in the storage system.

Solution to Problem

A storage system according to an aspect of the present invention includes a plurality of controllers each including a processor module and a memory, and a relay unit configured to relay a communication between the processor modules. The relay unit is configured to execute assigning determination of determining one of the processor module of a first controller and the processor module of a second controller as a processor module that processes a command stored in the memory, the first controller being one of the controllers that includes the memory storing the command, the second controller being any of the controllers other than the first controller. when the relay unit determines the command to be processed by the processor module of the first controller, the relay unit is configured to notify storage location information, indicating a storage location of the command in the memory of the first controller, to the processor module of the first controller, and when the relay unit determines the command to be processed by the processor module of the second controller, configured to transfer the command to the second controller.

Advantageous Effects of Invention

In the present invention, a smaller processing load, related to an I/O request from a host computer, on a processor can be achieved in a storage system.

BRIEF DESCRIPTION OF DRAWINGS

FIG. 7 is a diagram illustrating an example of a configuration of a processor identification table.

DESCRIPTION OF EMBODIMENTS

Figure 1:
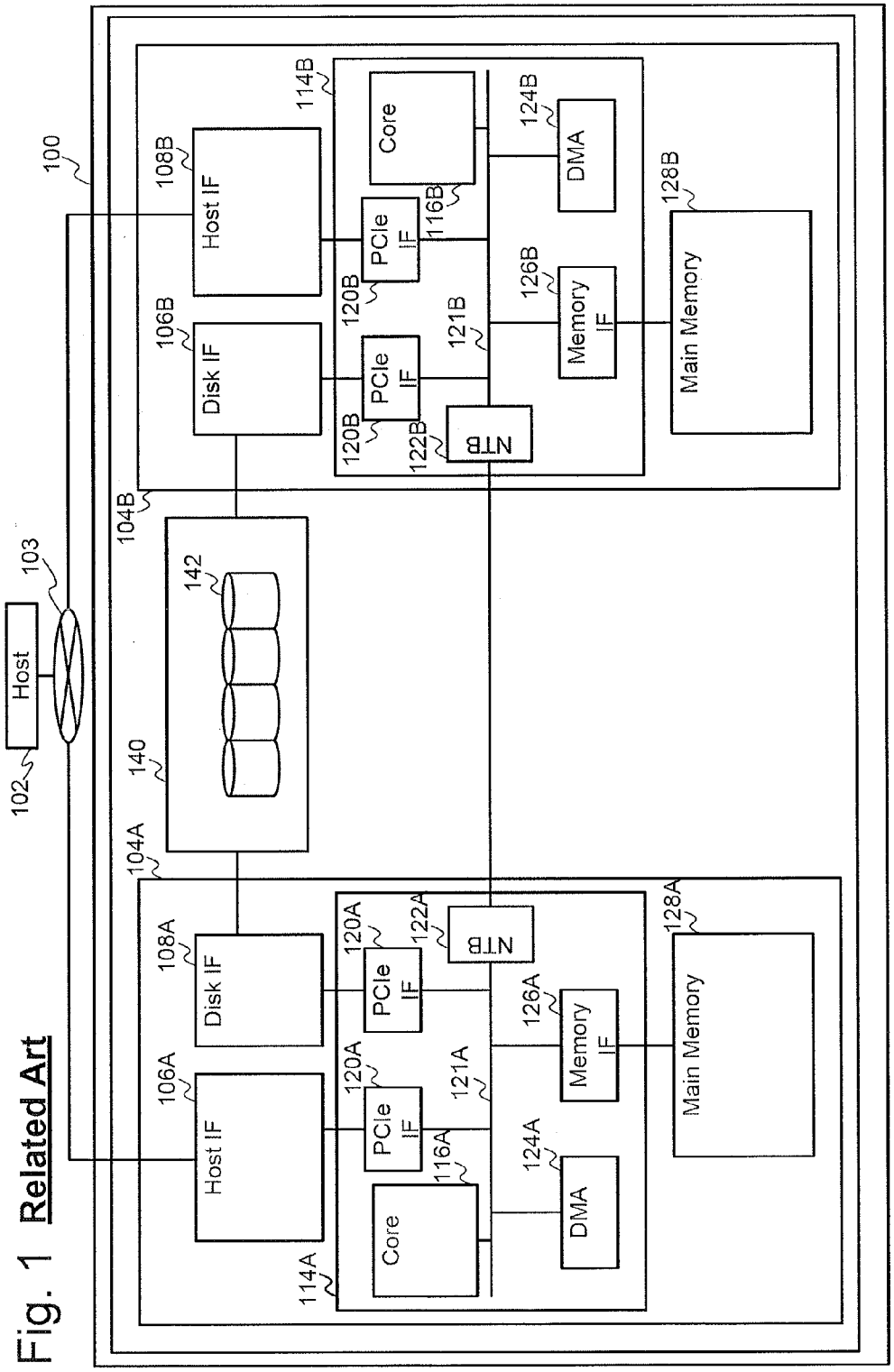
FIG. 1 is a diagram illustrating an example of a configuration of a storage system according to a comparative example.

An embodiment is described below.

In the description below, expressions such as "xxx table", "xxx queue", and "xxx list" are used to describe information in some cases. It is to be noted that the information can be expressed with any data structure. Thus, the expressions "xxx table", "xxx queue", and "xxx list" may be referred to as ""xxx information" to indicate that the information does not depend on data structures.

In the description below, processing is described with a "program" as the subject in some cases. The program is executed by a processor (for example, a central processing unit (CPU)), and predetermined processing is executed with at least one of a storage resource (for example, a memory) and a communication interface device used as appropriate. Thus, the subject of the processing may be a processor or a device including the processor. The processing executed by the processor may be partially or entirely executed by a hardware circuit. A computer program may be installed from a program source that may be a program distribution system or a storage medium (for example, a portable storage medium).

In the description below, when components of the same type are described while being distinguished from each other, reference numerals may be used in a manner such as "controller 204A" and "controller 204B". When the components of the same type are described without being distinguished from each other, only a common part of the reference numerals may be used in a manner such as "controller 204".

Description on Comparative Example

Before a feature of the embodiment is described, a storage system 100, serving as a comparative example of the embodiment, is described with reference to FIGS. 1 to 3.

FIG. 1 is a diagram illustrating an example of a configuration of the storage system 100 according to the comparative example. The storage system 100, illustrated in FIG. 1, is used for a comparison with a storage system 200 described below according to the embodiment illustrated in FIG. 4.

A host computer 102 is coupled to the storage system 100 through a communication network 103. A management device (not illustrated) that manages the storage system 100 may be coupled to the storage system 100 through the communication network 103.

An example of the communication network 103 includes: a storage area network (SAN) based on FibreChannel; a local area network (LAN) based on Ethernet (registered trademark); and the like.

The host computer 102 transmits command, such as a write request and a read request for data, to storage controllers 104A and 104B. The command may be transmitted while being included in a packet or a frame based on a protocol supported by the communication network 103. The host computer 102 may be an open server or a mainframe computer.

The storage system 100 includes the storage controllers 104A and 104B and a disk enclosure 140.

The disk enclosure 140 includes a plurality of disks 142 including a storage medium. An example of the disk 142 includes a hard disk drive (HDD), a solid state drive (SSD), and the like.

The storage system 100 may store data, transmitted from the host computer 102, in a logical volume that is a logical storage area formed of a redundant arrays of inexpensive disks (RAID) group including the plurality of disks 142. When one of the disks 142 forming the RAID group fails, the storage system 100 can restore data stored in the failed disk 142 with data and parity of another disks 142 in the same RAID group and parity.

The storage controller 104 controls the storage system 100. The storage controller 104 includes a host I/F 106, a disk I/F 108, a processor 114, and a main memory 128. Each of the host I/F 106, the disk I/F 108, the processor 114, and the main memory 128 may be provided in plurality.

For example, upon receiving a command, related to a read request, from the host computer 102, a storage controller 104A executes read processing of reading data as a target of the read request from the disk 142 in the disk enclosure 140 and transmits the reading data to the host computer 102 as a response. For example, upon receiving a command, related to a write request, from the host computer 105, the storage controller 104 executes write processing of writing data, as a target of the write request, in the disk 142 in the disk enclosure 140, and transmits a completion response to the host computer 102.

The host I/F 106 is an I/F with which the processor 114 is coupled to the communication network 103 and enables the processor 114 to perform data communications with the host computer 102. For example, when the protocol on a side of the host computer 102 is FibreChannel, and the protocol on a side of the processor 114 is a PCI Express (PCIe), the host I/F 106 performs protocol conversion between the FibreChannel and PCIe.

The disk I/F 108 is an I/F that enables the processor 114 to perform data communications with the disk enclosure 140. For example, when the protocol on a side of the disk I/F 108 is FibreChannel, and the protocol on a side of the processor 114 is PCIe, the disk I/F 108 performs protocol conversion between the FibreChannel and PCIe. The disk I/F 108 may perform address conversion between a logical volume provided to the host computer 102 and a physical volume formed on the disk 142.

The main memory 128 is a device for storing data. The main memory 128 may store: a computer program executed by a core 116 of the processor 114; data used by the computer program; and cache data related to writing/reading to and from the disk 142. An example of the main memory 128 includes a Dynamic Random. Access Memory (DRAM), a Magnetoresistive Random Access Memory (MRAM), a Phase-Change Memory, a Resistive Random-Access Memory (ReRAM), a Ferroelectric Random Access Memory (FeRAM), and the like.

The processor 114 processes a computer program and data transferred to and from the host I/F 106, the disk I/F 108, the main memory 128, etc., to implement various functions of the controller 104. For example, the processor 114 includes the core 116, a memory I/F 126, a PCIe I/F 120, a Direct Memory Access (DMA) controller 124, the memory I/F 126, and a Non Transparent Bridge (NTB) 122 that are coupled to each other through an internal bus 121 (for example, PCIe bus) so as to be able to communicate in both ways with each other.

The core 116 is an arithmetic circuit that processes a computer program and data, and may be a plurality of elements. The memory I/F 126 is an I/Fused for coupling the main memory 128. An example of the memory I/F 126 includes a Double-Data-Rate (DDR) I/F and the like. The DMA controller 124 is used when write data is transferred to another controller (104B for example), to ensure redundancy of the write data corresponding to a command related to the write request from the host computer 102. The NTB 122 is an I/Fused, for example, by the processor 114A to perform data communications with another processor 114B. The subject of the processing described below is the "processor 114", meaning that the core 116 may also be regarded as the subject of the processing.

For example, the processor 114 sets a parameter related to data transferring performed by the host I/F 106 and the disk I/F 108, monitors a failure of the storage system 100, and executes processing for a failure that has been detected.

The controller 104 may include a plurality of the processors 114. In such a configuration, the processors 114 may each include the main memory 128, or the processors 114 may include the main memory 128 that can be shared among the processors. Upon acquiring a command from the host I/F 106 or the disk I/F 108, the processor 114 determines the processor 114 assigned the processing for the command is assigned from the processors 114, and transmits the command to the assign-destination processor 114.

Figure 2:
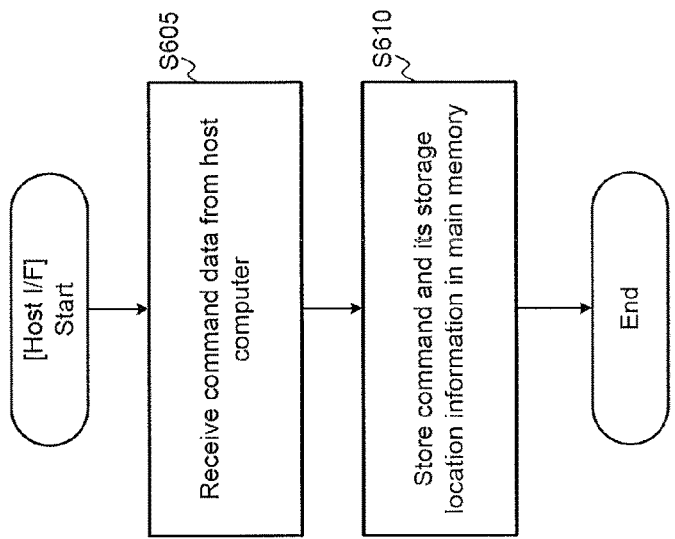
FIG. 2 is a flowchart illustrating an example of processing executed by a host interface (I/F) according to the comparative example upon receiving a command from a host computer.

FIG. 2 is a flowchart illustrating an example of processing executed by the host I/F 106 according to the comparative example upon receiving a command from the host computer.

The following processing starts when the host I/F 106 receives a command (a read command, a write command, or the like) from the host computer 102 (S605).

The host I/F 106 stores the command thus received in the main memory 128, and also stores storage location information, indicating a storage location of the command on the main memory, in the main memory 128 (S610), and the processing is terminated.

Figure 3:
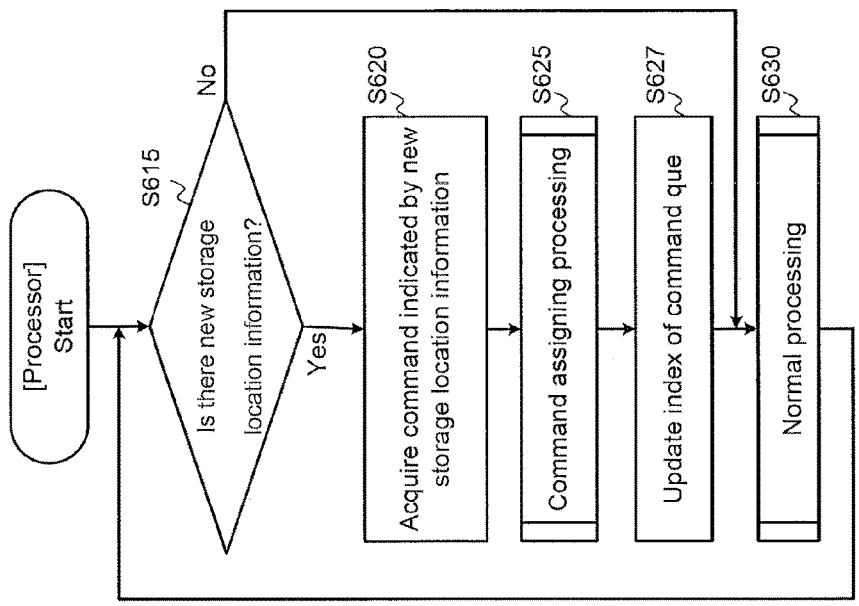
FIG. 3 is a flowchart illustrating an example of processing executed by a processor according to the comparative example.

FIG. 3 is a flowchart illustrating an example of processing executed by the processor 114 according to the comparative example.

The processor 114 accesses the main memory 128 to check whether there is new storage location information. Thus, the processor 114 determines whether a new command is stored in the main memory 128 (S615). This determination may be made at a predetermined interval.

When there is no new storage location information in the main memory 128 (S615: No), the processor 114 executes normal processing (S630), and the processing is terminated. The normal processing is processing normally executed by the processor 114, involving no assignment of a command, and is, for example, processing of executing the command, processing of controlling a storage controller, and the like.

When there is new storage location information in the main memory 128 (S615: Yes), the processor 114 acquires a command and information required for assigning from the main memory 128, based on the new storage location information (S620).

The processor 114 executes command assigning processing based on the content of the command thus acquired (S625). The command assigning processing is described in detail below (see FIG. 3). The processor 114 that has completed the command assigning processing updates an index of a command queue where the command has been stored (S627). Then, the processor 114 executes the normal processing (S630), and the processing returns to S615.

Figure 4:
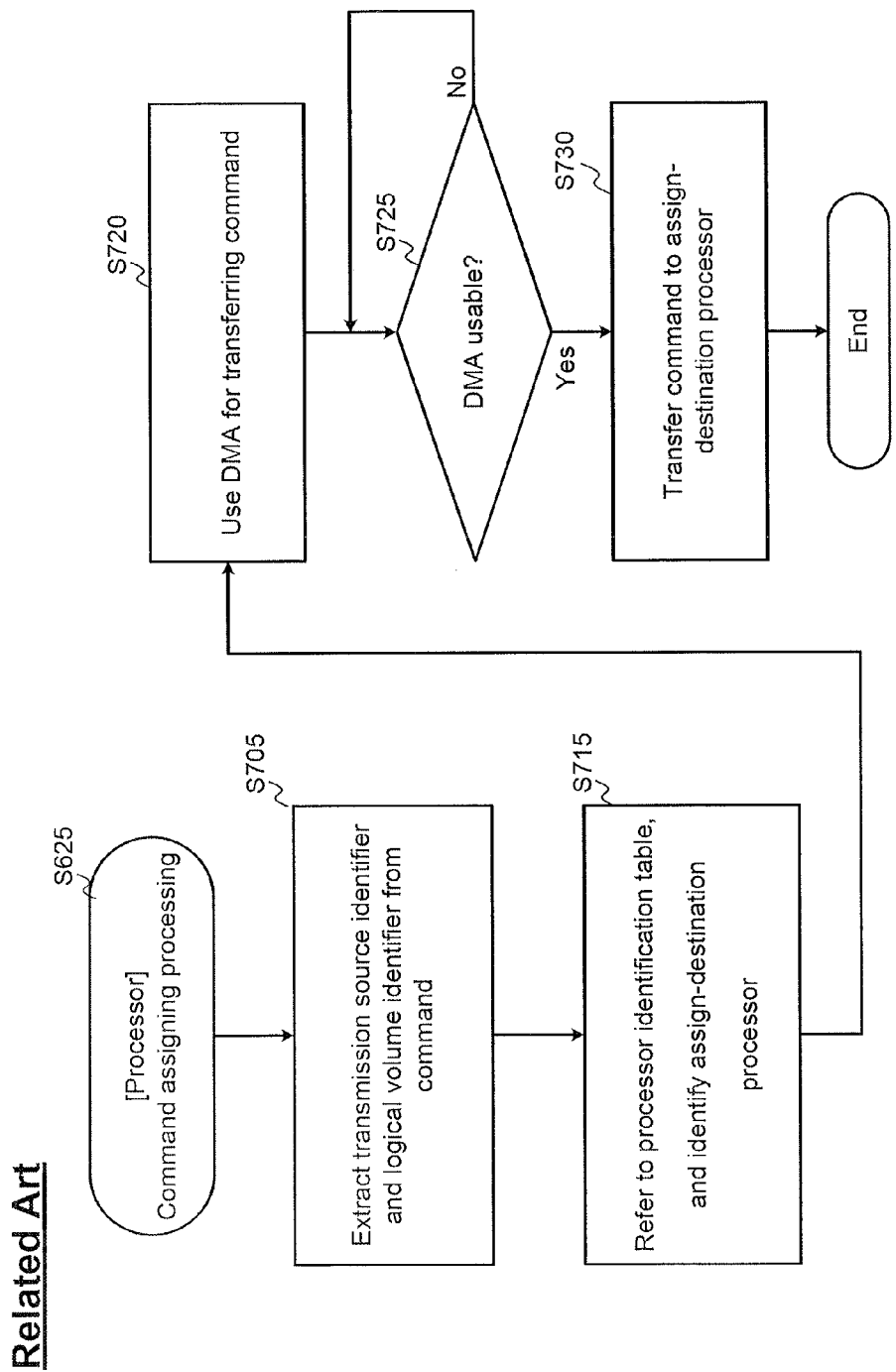
FIG. 4 is a flowchart illustrating a command assigning processing in FIG. 3 in detail.

FIG. 4 is a flowchart illustrating the command assigning processing (S625) in FIG. 3 in detail.

The processor 114 extracts from the command, a transmission source identifier for identifying the transmission source of the command, and a logical volume identifier for identifying a logical volume as a target of the command (S705).

The processor 114 refers to a predetermined table, and identifies a processor (that is, a command assign-destination processor) corresponding to the transmission source identifier and the logical volume identifier thus extracted (S715).

The processor 114 obtains a use permission for DMA for transferring the command to the assign-destination processor thus identified (S720).

The processor 114 is in standby as long as the use permission for the DMA is not obtained (S725: No). When the use permission for the DMA is obtained (S725: Yes), the processor 114 transfers through DMA the command to storage area of the main memory 128 that can be referred to by the assign-destination processor (S730), and the processing is terminated. Thereafter, the assign-destination processor executes the normal processing by referring to the storage area, in the main memory, to which the command has been transferred (S630).

As described above, in the storage system 100 according to the comparative example, the processor 114 determines a processor assigned the command, and transfers the command to the assign-destination processor through DMA. At this time, for example, the command is transferred again even when the processor 114A is determined as the assign-destination processor as a result of the assigning processing by the processor 114A.

The storage system 100 according to the comparative example has a problem that a large processing load is imposed on the processor 114 that executes the command assigning processing. The processing executed by the processor 114 is not limited to the command assigning processing and includes various other types of processing. Thus, for example, when the host computer 102 issues a large number of commands, a large processing load is imposed for the command assigning processing, and thus a performance of the storage system 100 as a whole is degraded. When the processing is executed by the processor in charge of assigning, the transferring of the command is required again. Thus, there is an overhead due to time required for the processing, leading to degradation of the performance of the storage system 100 as a whole.

Description on Embodiment

Next, the storage system 200 according to the embodiment made in view of the problem in the comparative example described above is described.

Figure 5:
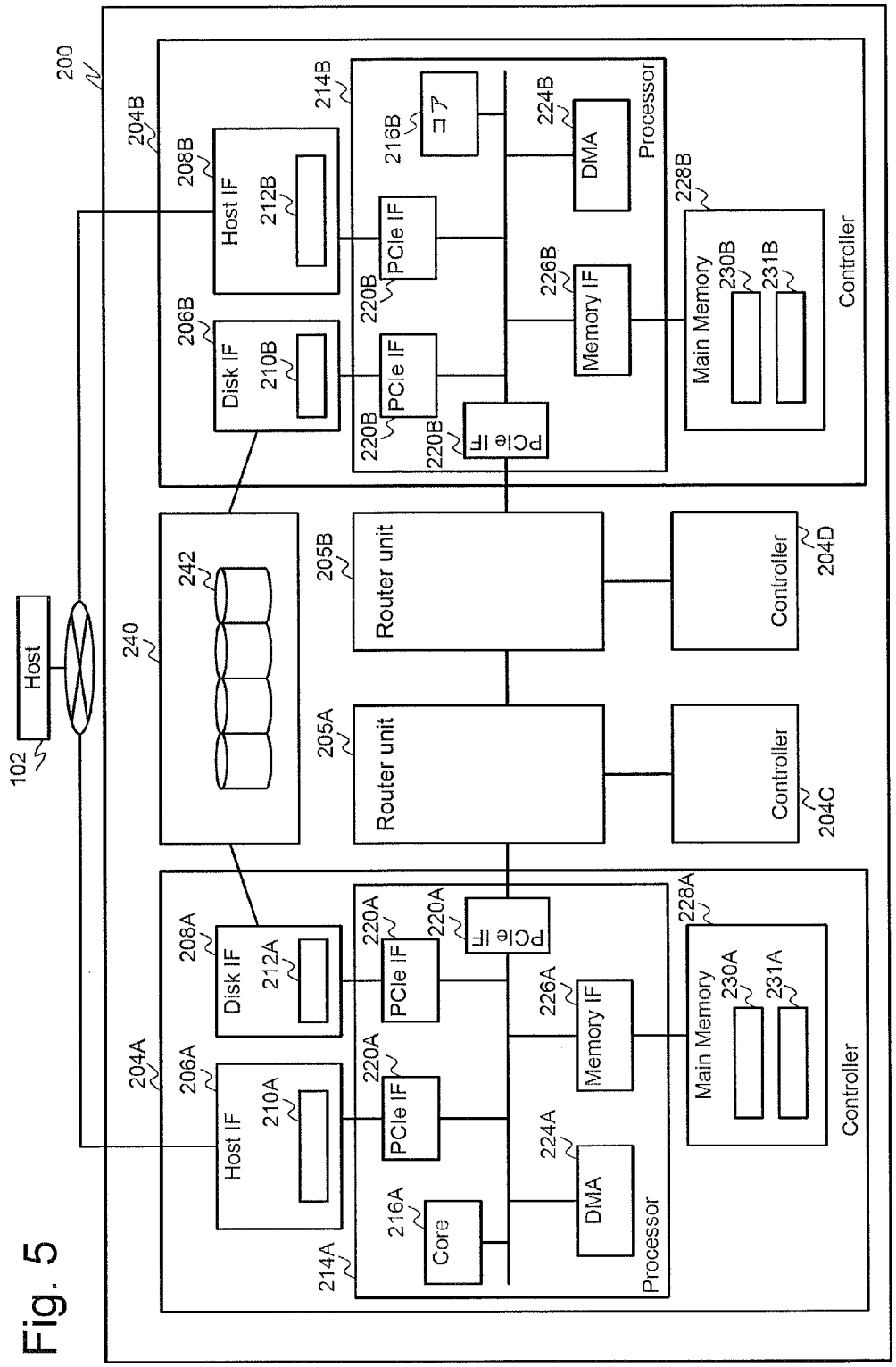
FIG. 5 is a diagram illustrating an example of a configuration of a storage system according to an embodiment.

FIG. 5 is a diagram illustrating an example of a configuration of the storage system 200 according to the embodiment.

A host I/F 206, a disk I/F 208, a main memory 228, a PCIe I/F 220, a core 216, a DMA controller 224, and a memory I/F 226 of the storage system 200 illustrated in FIG. 5 are respectively the same as or similar to the host I/F 106, the disk I/F 108, the main memory 128, the PCIe I/F 120, the core 116, the DMA controller 124, and the memory I/F 126 of the storage system 100 illustrated in FIG. 1, and thus the description thereof is omitted herein.

The storage system 200 illustrated in FIG. 5 is largely different from the storage system 100 illustrated in FIG. 1 in that a first router unit 205A and a second router unit 205B, each of which is one type of a relay device for a command. The first router unit 205A is coupled to controllers 204A and 204C. The second router unit 205B is coupled to controllers 204B and 204D. The router unit 205 is configured at a portion not on a path for storing the command, received by the host I/F 206 that receives the command from the host computer 102, in the main memory 228. The controllers 204A and 204B are hereinafter respectively referred to as "first and second controllers 204A and 204B" as appropriate.

The first router unit 205A and the second router unit 205B are coupled to each other through a predetermined communication path or communication network. An example of the communication path or the communication network includes PCIe, InfiniBand, FibreChannel, Ethernet, and the like.

The first router unit 205 in the storage system 200 according to the embodiment executes command assigning processing equivalent to the processing of assigning a command received from the host computer 102, which is executed by the processor 114 in the storage system 100 according to the comparative example.

Figure 6:
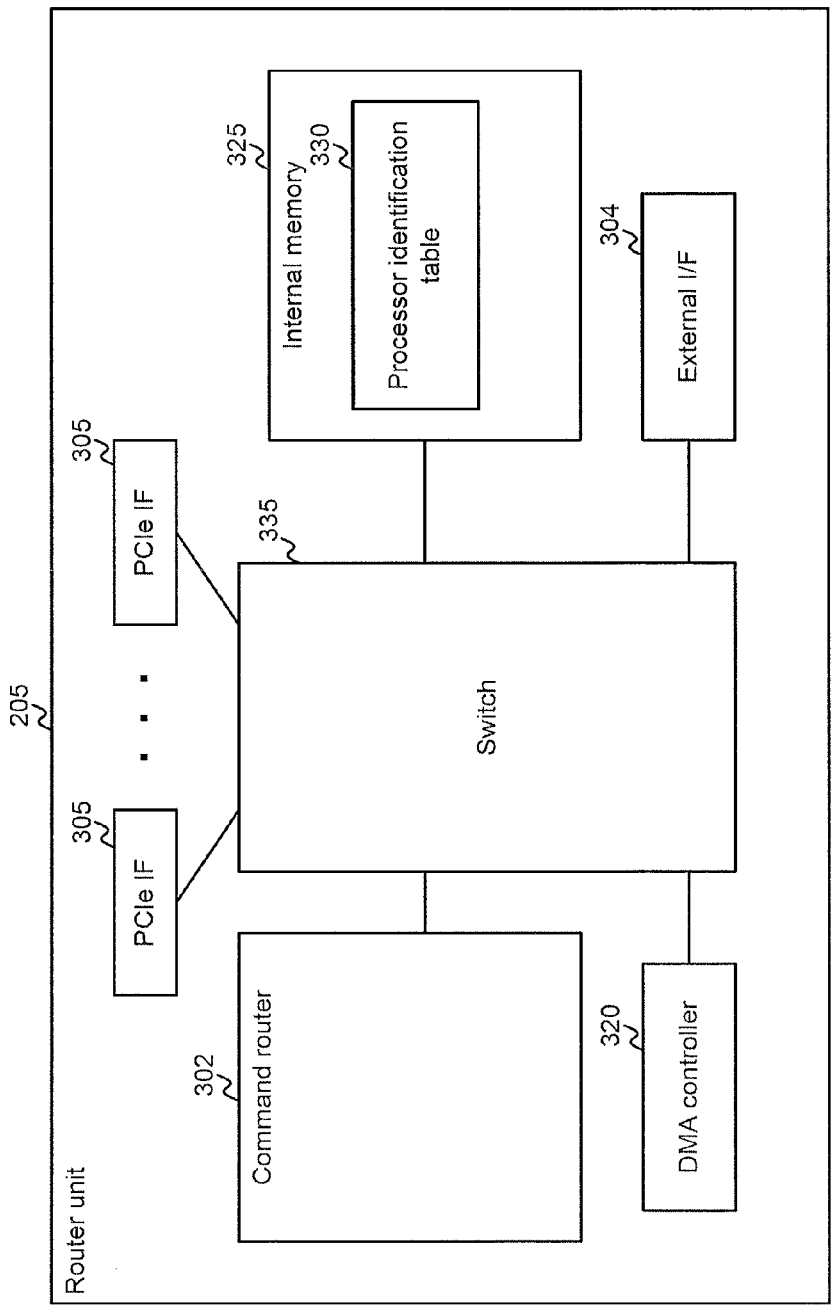
FIG. 6 is a diagram illustrating an example of a configuration of a router unit.

FIG. 6 is a diagram illustrating an example of a configuration of the router unit 205.

The router unit 205 includes a command router 302, an external I/F 304, a PCIe I/F 305, a DMA controller 320, an internal memory 325, and a switch unit 335. The elements 302, 304, 305, 320, and 325 can transmit and receive data to and from each other through the switch unit 335.

The PCIe I/F 305 is an I/F for coupling the controller 204 (processor 214).

The external I/F 304 is an I/F for coupling another router unit 205.

The DMA controller 320 is a device which command router 302 directly accesses the main memory 228 of the controller 204.

The internal memory 325 is a device that stores therein data, and for example, stores therein a processor identification table 330 described below.

The command router 302 checks whether a new command is stored in the main memory 228 of the controller 204 coupled to the router unit 205 of the command router 302. Upon detecting that a new command is stored, the command router 302 determines the processor 214 assigned the new command is assigned, from the processors 214 (core 216) coupled to the router unit 205 of the command router 302. This determination processing may be referred to as "assigning determination processing". The command router 302 may determine the assign-destination processor 214 based on the processor identification table 330.

The command router 302 determines whether the processor 214 assigned the command and the main memory 228 storing the command are in the same controller 204. When the processor 214 assigned the command and the main memory 228 storing the command are in the same controller 204, the command router 302 may transmit storage location information on the command to the processor 214 assigned the command, without actually transferring the command to the assign-destination processor.

The command router 302 determines whether the processor 214 assigned the command and the main memory 228 storing the command are in the same controller 204. When the processor 214 assigned the command and the main memory 228 storing the command are not in the same controller 204, the command router 302 may transfer the command to the assign-destination processor 214.

The command may be managed in a command queue 230 in the main memory 228. The storage location information indicating the storage location of a command may be an index number identifying the command in the command queue 230. Next, how a command is managed in the command queue 230 will be described.

For example, the host I/F 206 includes a consumer index 210 and the main memory 228 includes the command queue 230 and a producer index 231. The consumer index 210 and the producer index 231 will be described. First of all, the consumer index 210 is information indicating a position of the command queue 230, where a command is most recently retrieved by a consumer from the command queue 230. The producer index 231 is information indicating a position of the command queue 230 where a command is most recently input from the command queue 230 by a producer. Upon registering a command received from the host computer 102 in the command queue 230 of the main memory 228, the host I/F 206 registers the storage location information (index number) corresponding to the command, in the producer index 231. Meanwhile, upon retrieving a command from the command queue 230, the command router 302 registers the storage location information, corresponding to the command thus retrieved, in the consumer index 210 of the host I/F 206. Thus, it can be recognized that assigning processing has been completed for the storage location information registered in both the producer index 231 and the consumer index 210, and that the assigning processing has not been completed for the storage location information registered in the producer index 231 only. The storage location information registered in both the producer index 231 and the consumer index 210 may be deleted from the indices as appropriate.

FIG. 7 is a diagram illustrating an example of a configuration of the processor identification table 330.

The processor identification table 330 includes information for determining the processors 214 assigned the command received from the host computer 102. The processor identification table 330 includes one or two or more records having a transmission source identifier 1205, a logical volume identifier 1210, and a processor identifier 1215 as attributes.

The transmission source identifier 1205 is information for identifying the host computer 102 as the transmission source of the command. For example, the transmission source identifier 1205 is information for identifying a port of the host computer 102 as a transmission source of a packet or a frame including the command. For example, the transmission source identifier 1205 may be Source ID (S_ID) when the host computer 102 and the storage system 200 are coupled to each other based on FibreChannel supported by the SAN.

The logical volume identifier 1210 is information for identifying a logical volume as a target of the command. For example, the logical volume identifier 1210 may be a logical volume number indicating the storage location designated by the read request and the write request.

The processor identifier 1215 is an identifier for identifying a command assign-destination processor corresponding to a combination between the transmission source identifier 1205 and the logical volume identifier 1210. The processor identifier 1215 may be a unique identifier in the storage system.

For example, a record 331 of the processor identification table 330 illustrated in FIG. 6 indicates that when a target of a command transmitted from the host computer 102 corresponding to a transmission source identifier "00.00.ef" is a logical volume corresponding to a logical volume identifier "0", the command is to be assigned to a processor corresponding to a processor identifier "1".

As described above, the processor in charge of processing a command is identified for each logical volume designated with the command. Thus, a load for processing commands is more distributed among processors compared with the configuration where a predetermined processor is in charge of processing the commands. This all means that the performance of the storage system can be prevented from degrading.

Figure 8:
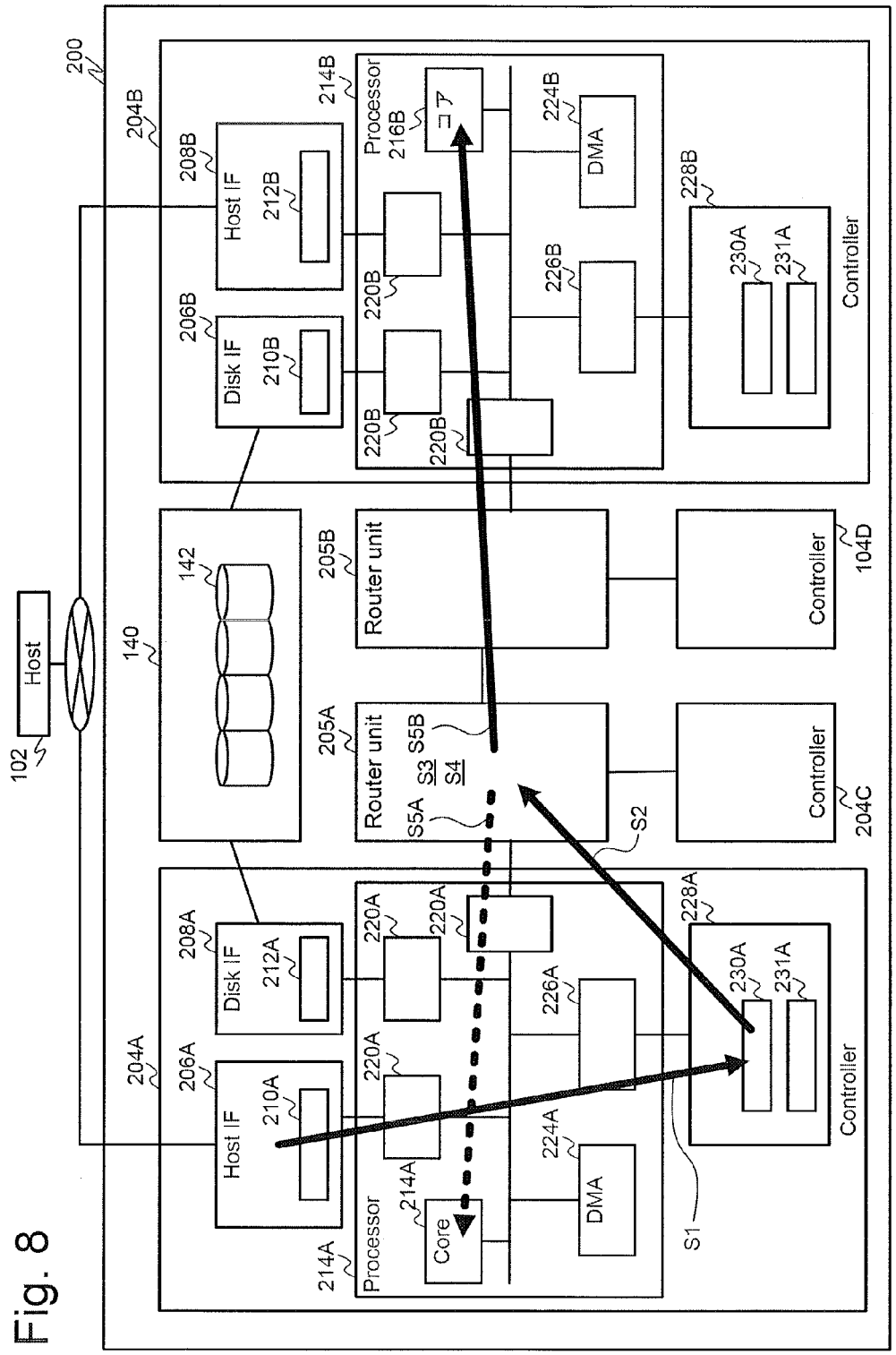
FIG. 8 is a diagram illustrating an overview of processing executed by a storage system according to the embodiment.

FIG. 8 is a diagram illustrating an overview of processing executed by the storage system 200 according to the embodiment.

An example of the overview of processing executed by the storage system 200 when the host computer 102 transmits a command to the first controller 204A is described below.

(S1) The host I/F 206A of the first controller 204A that has received a command from the host computer 102 stores the command in the main memory 228A.

(S2) The first router unit 205A checks the main memory 228A of the first controller 204A, and upon detecting that new storage location information has been stored, acquires a command indicated by the storage location information. How the first router unit 205A detects that new storage location information has been stored will be described. Specifically, whether the new storage location information has been stored is detected by checking the difference between the producer index 231 and the consumer index 210 of the command queue 230. In the present application, the assigning processing is executed by the router unit 205 and thus processor 204 does not intervene.

(S3) The first router unit 205A extracts the transmission source identifier and the logical volume identifier from the acquired command. The first router unit 205A refers to the processor identification table 330 to identify a processor identifier corresponding to the transmission source identifier and the logical volume identifier.

(S4) The first router unit 205A determines whether the processor corresponding to the processor identifier thus identified is in the first controller 204A.

(S5A) For example, when the processor 214 thus identified is the processor 214A in the first controller 204A, the first router unit 205A transmits to the processor 214A (core 216A), the storage location information on the command in the main memory instead of actually transferring the command.

(S5B) For example, when the processor 214 thus identified is the processor 214B in the second controller 204B, the first router unit 205A actually transfers the command to the processor 214B (core 216B) through the second router unit 205B. Here, the second router unit 205B may store the command, received from the first router unit 205A, in the main memory 228B of the second controller 204B, and may transmit the storage location information on the command in the main memory 228B to the processor 214B (core 216B).

For example, the embodiment provides the following advantageous effects.

(1) The command assigning processing is not executed by the processor as in the comparative example, and is executed by the router unit, whereby a processing load on the processor can be reduced. Thus, for example, even when a large number of commands are issued from the host computer, the load on the processor due to the assigning processing is not as large as that in the comparative example, whereby the performance as the storage system as a whole can be prevented from degrading.

(2) When the processor assigned the command and the main memory storing the command are in the same controller, the router unit may transmit only storage location information on the command to the processor instead of actually transferring the command. Thus, the performance of the storage system as a whole can be more effectively prevented from degrading compared with the configuration where the command is actually transferred in such an occasion.

Figure 9:
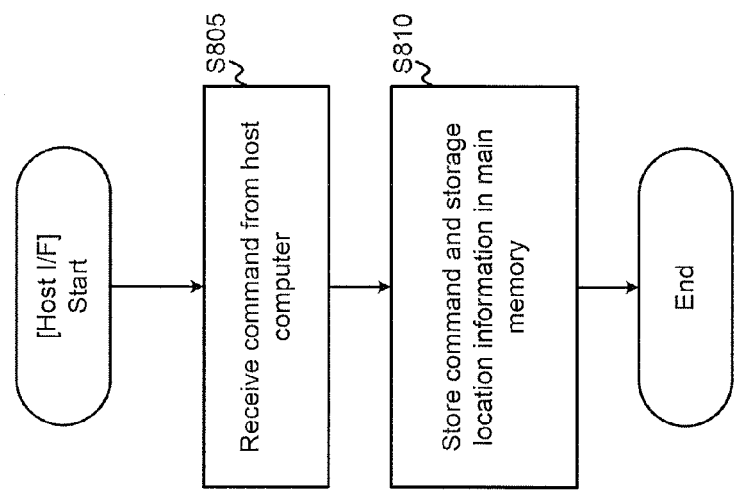
FIG. 9 is a flowchart illustrating an example of processing executed by a host I/F according to the embodiment upon receiving a command from a host computer.

FIG. 9 is a flowchart illustrating an example of processing executed by the host I/F 206 according to the embodiment upon receiving a command from the host computer 102.

The following processing starts when the host I/F 106 receives a command (such as a read request or a write request) from the host computer 102 (S805).

The host I/F 106 stores the command thus received in the command queue 230 in the main memory 228, and registers the storage location information corresponding to the command in the producer index 231 (S810), and the processing is terminated. In the producer index 231 as the registration destination, a value obtained by incrementing the current value of the producer index 231 is registered each time a command is stored. When a plurality of commands are stored, the registered value is obtained by adding a value corresponding to the number of commands to the current value.

Figure 10:
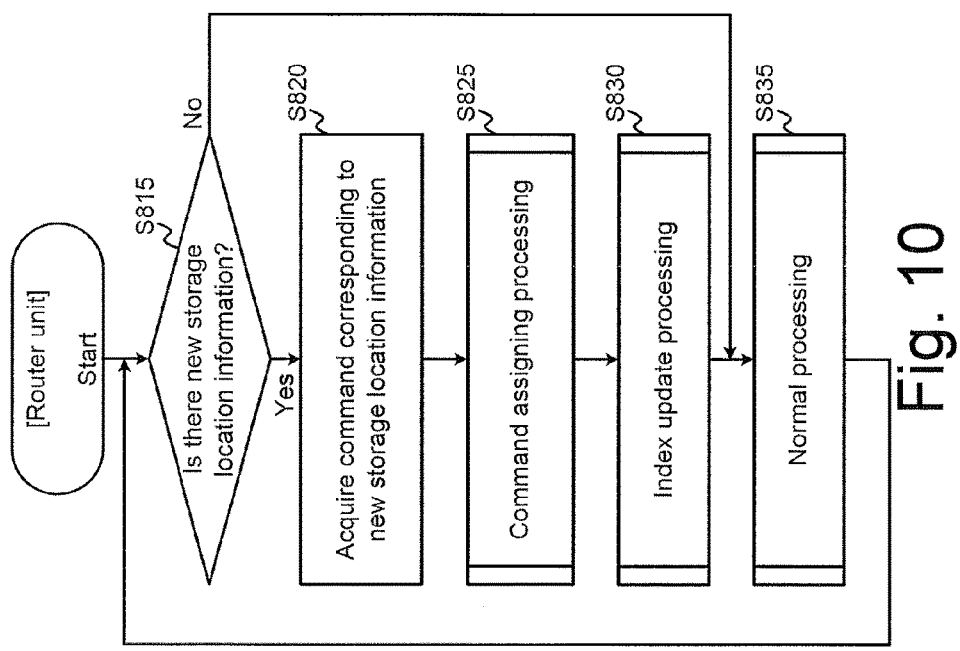
FIG. 10 is a flowchart illustrating an example of processing executed by a router unit according to the embodiment.

FIG. 10 is a flowchart illustrating an example of processing executed by the router unit 205 according to the embodiment.

The command router 302 in the router unit 205 periodically performs polling for the producer index 231 and the consumer index 210, in the main memory 228 in the controller 204, to determine whether there is new storage location information (S815). Alternatively, the command router 302 may make the determination described above every time a predetermined interrupt signal, transmitted from the processor in the controller 204 to the command router 302 in the router unit 205, is received.

When there is no new storage location information (S815: NO), the command router 302 executes the normal processing (S835), and the processing is terminated (End). The normal processing is processing normally executed by the command router 302.

When there is new storage location information (S815: Yes), the command router 302 acquires a command corresponding to the new storage location information (S820).

The command router 302 executes the command assigning processing based on the command thus acquired (S825). The command assigning processing is described in detail below (see FIG. 9).

After the command assigning processing is completed, the command router 302 executes index update processing (S830). The index update processing is described in detail below (see FIG. 13). Then, the command router 302 executes the normal processing (S830), and the processing returns to S815.

Figure 11:
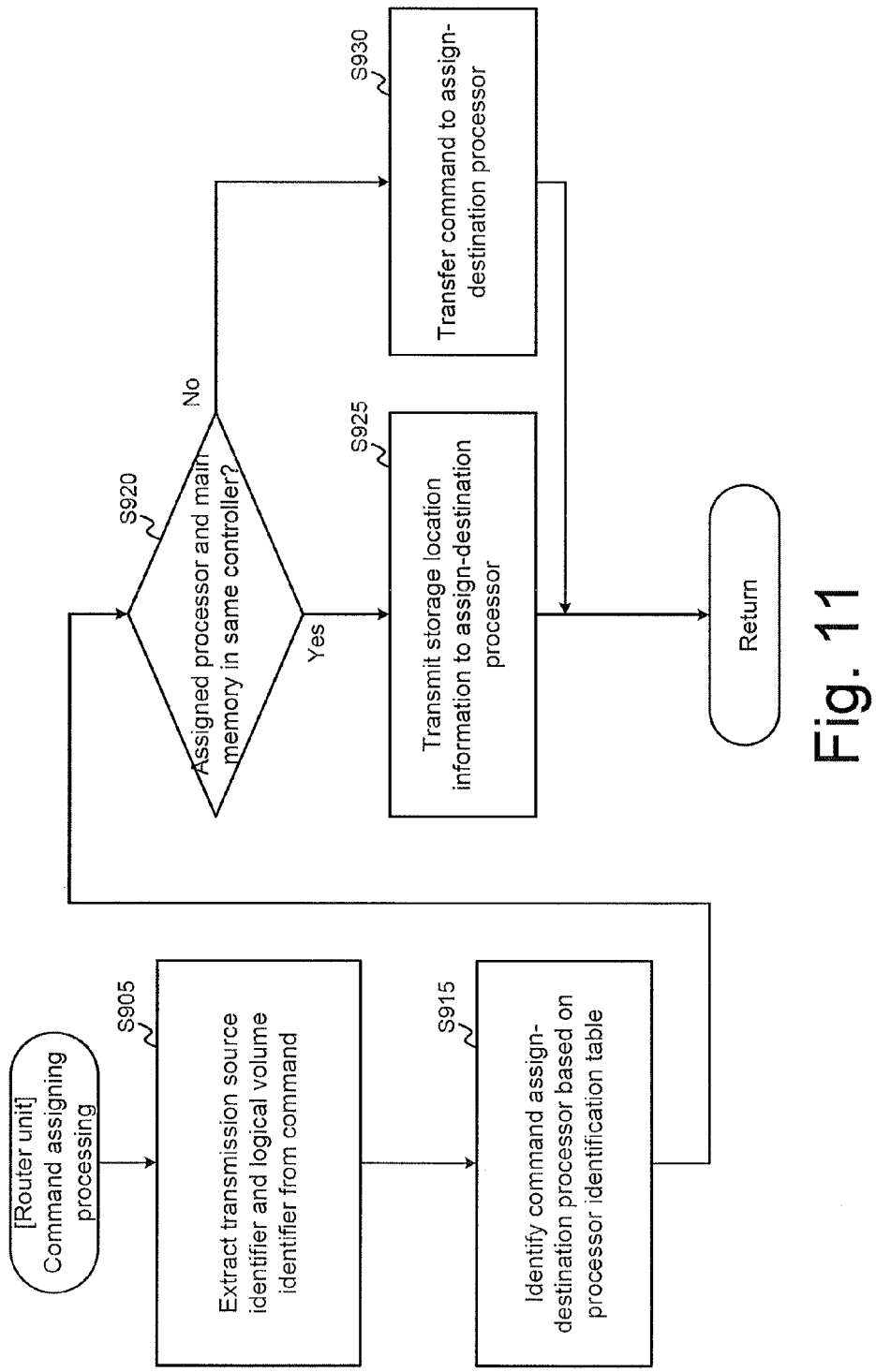
FIG. 11 is a flowchart illustrating a command assigning processing in FIG. 10 in detail.

FIG. 11 is a flowchart illustrating the command assigning processing (S825) in FIG. 10 in detail.

The command router 302 in the router unit 205 extracts the transmission source identifier and the logical volume identifier from the command (S905).

The command router 302 refers to the processor identification table 330, and identifies the assign-destination processor corresponding to the transmission source identifier and the logical volume identifier thus extracted (S915).

The command router 302 determines whether the assign-destination processor 214, identified in S915, and the main memory 228 storing the assigned command are in the same controller 204 (S920). The command router 302 recognizes in advance, a relationship between the processor 214 and the main memory 228 managed by the processor 214, based on an initial setting and the like.

When the assign-destination processor 214 and the main memory 228 storing the assigned command are in the same controller 204 (S920: Yes), the command router 302 transmits the storage location information, corresponding to the command, to the assign-destination processor 214 (S925), and the processing returns to the processing illustrated in FIG. 10.

When the assign-destination processor 214 and the main memory 228 storing the assigned command are in different controllers 204 (S920: No), the command router 302 transfers the command to the assign-destination processor 214 (S930), and the processing returns to the processing illustrated in FIG. 10.

Figure 12:
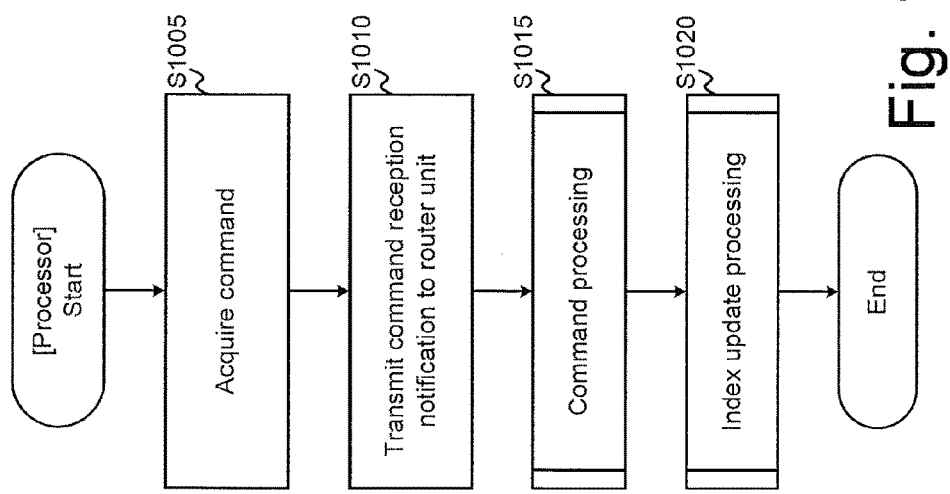
FIG. 12 is a flowchart illustrating processing executed by an assign-destination processor.

FIG. 12 is a flowchart illustrating processing executed by the assign-destination processor 214.

When the processor 214 receives the storage location information, the processing proceeds to the next S1010 after the processor 214 acquires the command corresponding to the storage location information from the main memory 228. When the processor 214 receives the command, the processing directly proceeds to the next S1010 (S1005).

The processor 214 transmits a command reception notification indicating that the command has been received, to the router unit 205 as a transmission source of coupling destination information or the command (S1010).

The processor 214 executes command processing based on the content of the command (S1015). After the command processing is completed, the processor 214 updates the consumer index 210 and the producer index 231 (S1020), and the processing is terminated.

Figure 13:
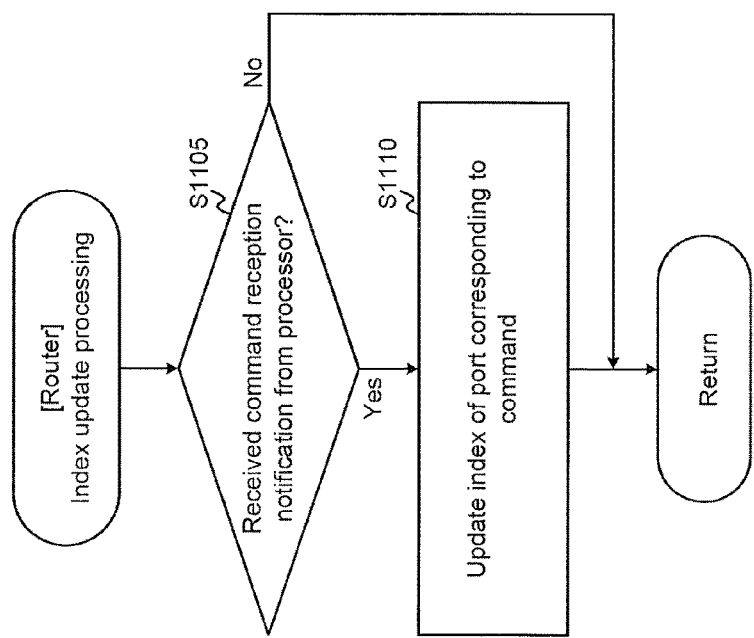
FIG. 13 is a flowchart illustrating index update processing in FIG. 10 in detail.

FIG. 13 is a flowchart illustrating the index update processing (S830), in FIG. 10, in detail.

The command router 302 determines whether the command reception notification has been received from the assign-destination processor 214 (S1105).

When the command reception notification has been received (S1105: Yes), the command router 302 updates the consumer index 210 and the producer index 231 of the port corresponding to the command reception notification (S1110), and the processing returns to the processing illustrated in FIG. 10.

When the command reception notification has not been received by the command router 302 (S1105: No), the processing returns to the processing in FIG. 10.

In the processing described above, the index update processing (S1110) is executed after the command reception notification has been received from the assign-destination processor 214 (S1105: Yes), to prevent mismatch between the producer index 231 and the consumer index 210. The producer index 231 and the consumer index 210 might be mismatched when they are updated at the same timing by the host I/F 206, the command router 302, and the like that can commonly access the processor 214.

Figure 14:
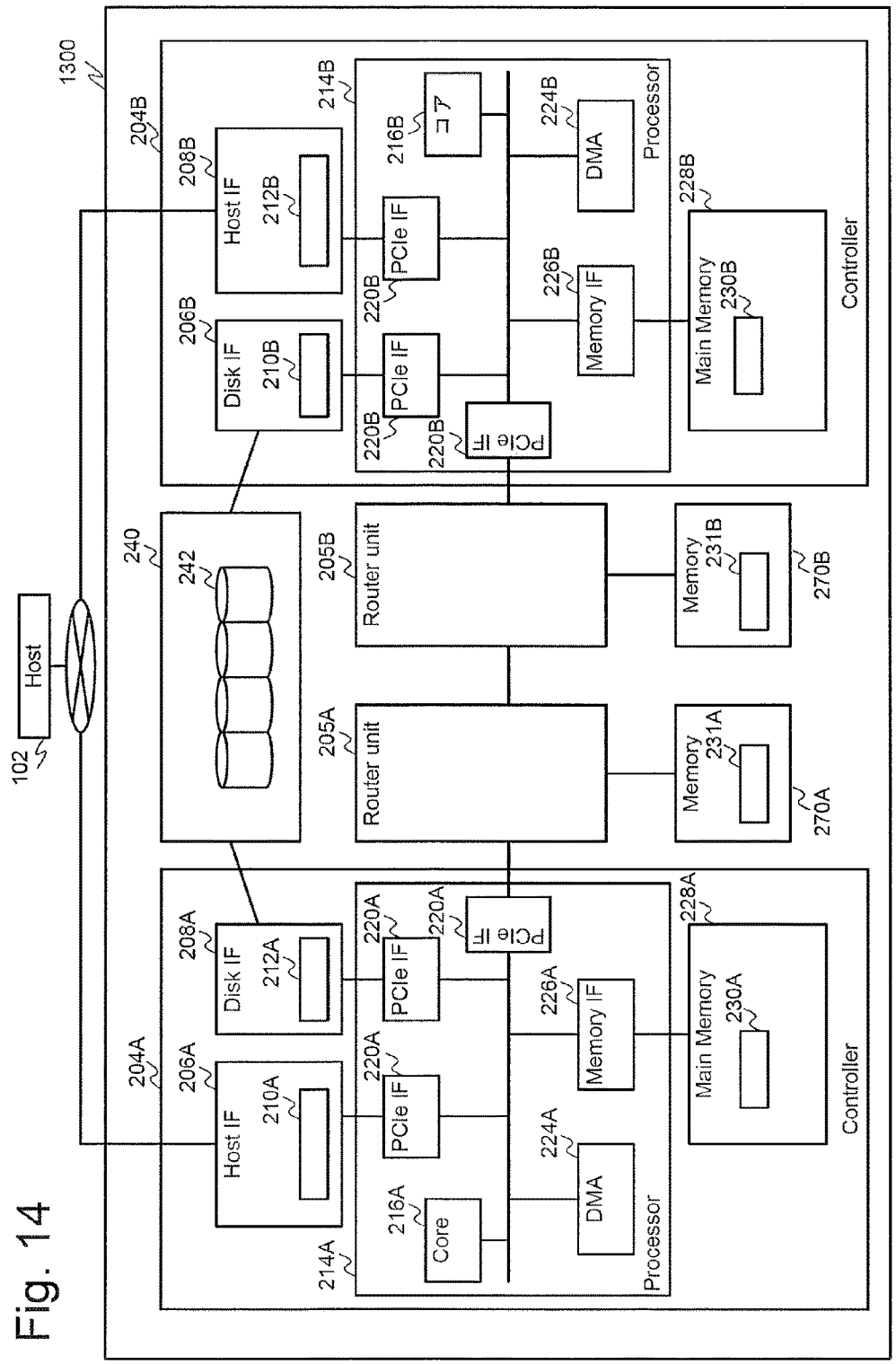
FIG. 14 is a diagram illustrating a modification of the storage system according to the embodiment.

FIG. 14 is a diagram illustrating a modification of the storage system according to the embodiment.

A storage system 1300, illustrated in FIG. 14, is different from the storage system 200 illustrated in FIG. 5 in that the producer index 231 is not in the main memory 228 of the storage controller 104 and is in a memory 270 coupled to the router unit 205. In this configuration, the distance of the path between the router unit 205 and the producer index 231 is shorter than the configuration illustrated in FIG. 5. Thus, the assigning processing can be executed by the router unit 205 within a shorter period of time.

The embodiments described above are given as an example for describing the present invention. Thus, there is no intension to limit the scope of the present invention to the embodiments. A person skilled in the art can implement the present invention in various modes, without departing from the gist of the present invention.

For example, in FIG. 5, the portion in the processor 214 excluding the PCIe I/F 220 may be referred to as a processor module. For example, in the storage system including only two controllers 204, the PCIe I/F 220 may be replaced with a relay device that communicates with the processor module of the counterpart and performs the determination that is the same as that performed by the router unit 205, so that the router unit 205 is not provided. Furthermore, the "controller" may be a device including the processor module and the main memory 228, and not including the PCIe I/F 220.

The PCIe I/F 220 may be an I/F used for communications between the processor module and another processor. The relay device may be exemplified by at least one PCIe I/F 220 or at least one router unit 205, or both.

For example, the controller 204 in the description above may be referred to as a "cluster" including the host I/F 206, the disk I/F 208, the processor 214, and the main memory 228 The controller 204 may include a plurality of the processors 214 and a plurality of the main memories 228. Also in this configuration, when the main memory 228 storing the command and the processor 214 assigned the command are in the same controller 204, the router unit 205 may transmit only the storage location information to the assign-destination processor 214.

REFERENCE SIGNS LIST

102 Host computer
200 Storage system
204 Controller
205 Router unit
206 Host I/F
214 Processor
228 Main memory

The invention claimed is:

1. A storage system comprising:
a first controller including a first processor module and a first memory;
a second controller including a second processor module and a second memory; and
a relay unit configured to relay a communication between the first controller and the second controller,
wherein the relay unit is configured to execute assigning determination processing to determine one of the first processor module of the first controller and the second processor module of the second controller as a processor module that processes a command stored in the first memory of the first controller,
wherein when the relay unit determines the first processor module of the first controller as the processor module that processes the command, the relay unit is configured to notify the first processor module of the first controller of first storage location information, indicating a storage location of the command in the first memory of the first controller, and
wherein when the relay unit determines the second processor module of the second controller as the processor module that processes the command, the relay unit is configured to transfer the command in the first memory of the first controller to the second controller.

2. The storage system according to claim 1, wherein
the first controller further includes a host interface configured to receive the command from a host computer,
the host interface of the first controller stores the command, received from the host computer, in the first memory of the first controller, and
the relay unit is configured to access the first memory of the first controller at a predetermined timing to check whether the first controller has received a new command, and configured to execute, upon ascertaining that the first controller has received the new command, the assigning determination for the new command.

3. The storage system according to claim 1, wherein the second processor module of the second controller is configured to transmit, upon acquiring the command transferred from relay unit, a reception notification indicating that the command has been received, to the relay unit.

4. The storage system according to claim 1, wherein the relay unit is configured to determine, in the assigning determination, a controller to which the command is to be assigned, based on a transmission source identifier indicating a transmission source of the command and a target logical volume identifier indicating an execution target of the command.

5. The storage system according to claim 1, wherein
the first controller further includes a host interface configured to receive the command from a host computer, the host interface of the first controller is configured to store the command, received from the host computer, in the first memory of the first controller, and transfer the storage location information of the command to the relay unit, and the relay unit is configured to check whether the first controller has received a new command, based on the storage location information transferred from the host interface, and configured to execute, upon ascertaining that the first controller has received the new command, the assigning determination for the new command.

6. A storage control method comprising, by a relay unit coupled to a first controller including a first processor module and a first memory, and a second controller including a second processor module and a second memory:

executing assigning determination processing to determine one of the first processor module of the first controller and the second processor module of the second controller as a processor module that processes a command stored in the first memory of the first controller;

wherein when the relay unit determines the first processor module of the first controller as the processor module that processes the command, notifying the first processor module of the first controller of storage location information, indicating a storage location of the command in the first memory of the first controller; and wherein when the relay unit determines the second processor module of the second controller as the processor module that processes the command, transferring the command in the first memory of the first controller to the second controller.

7. The storage control method according to claim 6, wherein the first controller further includes a host interface configured to receive the command from a host computer, the host interface of the first controller stores the command, received from the host computer, in the first memory of the first controller, and the relay unit is configured to access the first memory of the first controller at a predetermined timing to check whether the first controller has received a new command, and configured to execute, upon ascertaining that the first controller has received the new command, the assigning determination for the new command.

8. The storage control method according to claim 6, wherein the second processor module of the second controller is configured to transmit, upon acquiring the command transferred from relay unit, a reception notification indicating that the command has been received, to the relay unit.

9. The storage control method according to claim 6, wherein the relay unit is configured to determine, in the assigning determination, a controller to which the command is to be assigned, based on a transmission source identifier indicating a transmission source of the command and a target logical volume identifier indicating an execution target of the command.

10. A relay unit disposed between a first controller including a first processor module and a first memory, and a second controller including a second processor module and a second memory and configured to relay a communication between the first processor module and the second processor module, wherein the relay unit is configured to execute assigning determination processing to determine one of the first processor module of the first controller and the second processor module of the second controller as a processor module that processes a command stored in the first memory of the first controller, wherein when the relay unit determines the first processor module of the first controller as the processor module that processes the command, the relay unit is configured to notify the first processor module of the first controller of storage location information indicating a storage location of the command in the first memory of the first controller, and wherein when the relay unit determines the second processor module of the second controller as the processor module that processes the command, the relay unit is configured to transfer the command in the first memory of the first controller to the second controller.

11. The relay unit according to claim 10, wherein the relay unit is configured to access the first memory of the first controller at a predetermined timing to check whether the first controller has received a new command, and configured to execute, upon ascertaining that the first controller has received the new command, the assigning determination for the new command.

12. The relay unit according to claim 10, wherein the relay unit is configured to determine, in the assigning determination, a controller to which the command is to be assigned, based on a transmission source identifier indicating a transmission source of the command and a target logical volume identifier indicating an execution target of the command.

13. The relay unit according to claim 10, wherein the relay unit is configured to check whether the first controller has received a new command, based on the storage location information transferred from the host interface, and configured to execute, upon ascertaining that the first controller has received the new command, the assigning determination for the new command.

* * * * *